April 27, 1943.　　　　J. F. O'BRIEN　　　　2,317,964
ELECTRICAL WIRING SYSTEM
Original Filed Dec. 19, 1939
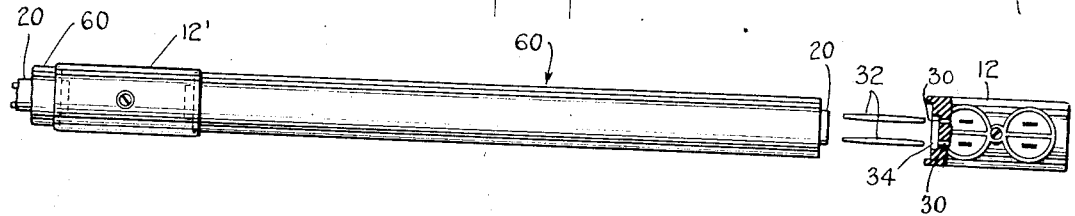
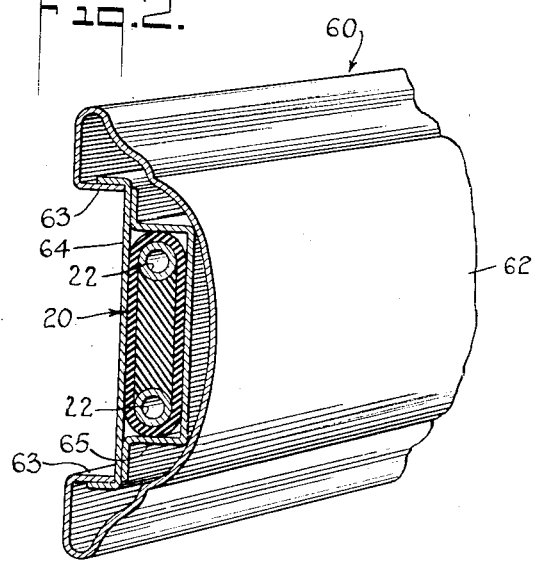
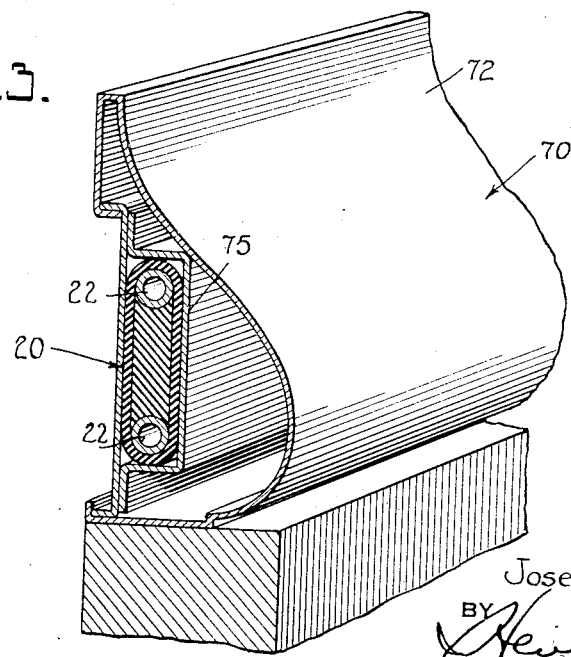
INVENTOR
Joseph F. O'Brien
BY Henry J. Lucke
HIS ATTORNEY Patented Apr. 27, 1943

2,317,964

UNITED STATES PATENT OFFICE 2,317,964

ELECTRICAL WIRING SYSTEM

Joseph F. O'Brien, Jersey City, N. J., assignor to John B. Pierce Foundation, New York, N. Y., a corporation of New York Original application December 19, 1939, Serial No. 309,941. Divided and this application September 13, 1941, Serial No. 410,676

6 Claims. (Cl. 174—101)

The present invention relates to improvements in electric wiring systems.

In particular, the present invention relates to improved wiring systems embodying "run" units and "connector" units electrically and mechanically interconnected in seriatim, a connector unit being disposed intermediate two run units and thereby affording means of electrically connecting electricity conductors of such run units, and desirably, affording means of securing such run units in desired operative position.

It is an object of the present invention to provide improved run units and connector units for a wiring system of the type stated, the run units being desirably of standardized lengths, and embodying channel means wherein an electricity conductor unit of appropriate length is slidably contained.

It is a further object of the present invention to provide a wiring system comprising run units and therewith assembled connector units which may be readily cut to desired length at the place of installation.

In the present invention the run unit may comprise a housing structure of preferably standard length, desirably of sheet metal or the like, embodying face plate means shaped and decorated as desired, and back plate means positioned in a predetermined location with respect thereto, said back plate means affording a longitudinal channel disposed beneath said facing plate.

Said channel is adapted to accommodate a conductor unit comprising spaced electricity conductors, mutually electrically insulated, and provided with an external insulating covering. Such conductor units are slidably arranged within the stated channel, and project suitably beyond the ends of the housing, preferably about three-sixteenths of an inch at each end.

Advantageously, the conductors are tubular, of uniform diameter throughout.

For operative association with such run units, connector units are employed. Such connector units may advantageously be formed entirely of electrical insulation material, and incorporate preferably tubular electricity conductors, arranged for registry with the tubular conductors of a run unit. Electrical connection of the respective run unit and connector unit conductors may be made by electrically conductive pins, jumpers, or equivalent.

The connector units are advantageously provided with sockets or recesses for registry with the extending portions of the conductor means of a run unit, whereby such extending portions may project into the body of the connector unit in a male and female engagement. The connector units, further, may be provided with eave-like extensions, the undersurface thereof having a contour matching the external contour of the run units, and adapted thereby to overlie, snugly, the stated run units.

By providing the connector units with means whereby they may be fastened to the building structure, it is apparent that such connector units, through the agency of the stated eave-like extensions, may serve additionally to secure the run units in operative position.

This application is a division of my presently co-pending application Serial No. 309,941, filed December 19, 1939, and entitled Electrical wiring system.

Other features and advantages will hereinafter appear.

In the accompanying drawing:

Fig. 1 is a representation of a wiring system embodying one form of the present invention, and showing the interconnection between the conductor unit and the connector unit thereof;

Fig. 2 is a fragmentary perspective of the run unit of Fig. 1, with the conductor means thereof shown in section; and Fig. 3 is a fragmentary perspective of a second form of run unit.

Referring to Figure 1, a wiring system embodying the present invention comprises a plurality of run units 60, 60, arranged for electrical and mechanical interconnection by connector units 12, 12'. It will be noted that connector unit 12 may embody outlet means, whereas unit 12' is not so provided.

Run units 60 are desirably of standardized length. Preferably, each run unit is twelve (12) inches long, such length contemplating that the connector units 12 shall be of the order of four (4) inches in length, whereby the center to center distance between connector units will be sixteen (16) inches and, therefore, adaptable for securement to studding having a conventional spacing of sixteen (16) inches on centers.

The connector units 12, 12' may have a centrally arranged opening through which a wood screw or like fastening device may be passed for securement to the walls, floors, or studding of a building structure.

The run units 60 are advantageously formed from rolled or extruded metallic shapes.

The housing of run unit 60 embodies a facing plate 62, having marginal portions turned inwardly to afford tracks or runners 63. The channel providing member may be composite, being advantageously formed from two elements 64, 65, mutually permanently secured as by spot welding or equivalent. A conductor unit 20 is slidably housed within the illustrated pocket afforded by the stated elements 64, 65.

In the form shown in Figure 2, such conductor unit 20 embodies any desired plurality of electricity conductors 22, which conductors may advantageously be tubes of copper or equivalent electricity conducting material. Said conductors 22 are maintained in insulated spaced relationship, as by the intermediate insulator 24.

As appears from the drawing, it is preferable to have the opposing lateral edges of the insulator 24 grooved or channeled to form pockets within which such conductors 22 are secured.

For insulating the respective conductors 22 from the channel member of unit 60, an outer sleeve or envelope 26 of electrical insulation material may be employed. It has been found advantageous to form such outer envelope 26 by winding or braiding a continuous tape or fabric formed from glass fiber or the like; such fabric affords excellent insulation qualities, is rot- and vermin-proof, and affords a degree of flexibility to the conductor unit which may not be attained by an envelope of relatively stiffer materials.

It is to be noted that the composite channel member of the run unit 60 may not be permanently secured to the outer shell 62 thereof. The configuration and positioning of the rail-forming elements 63 insure the proper position of the channel forming member, and additionally, the corners of such composite channel forming member may engage the undersurface of facing plate 62. The accurate positioning thereby afforded such channel member assures that the conductor unit 20 of a run unit will register with the conductors of a connector unit.

In the structure illustrated in Figure 3, a generally similar method of construction may be employed. The outer shell member 72 of run unit 70 has configurated marginal surfaces which afford the desired "track" along which the channel forming elements may be moved. In such construction, a resilient engagement is had between the outer shell member 72 and the member 75 forming an element of the channel-providing section, such resilient engagement serving to rotate the stated channel forming section clockwise, thus forcing the lower flange of such channel forming section into engagement with the "track" provided at the lower surface of such unit 72, and maintaining the proper position of conductor unit 20 therein.

The connector unit 12 embodies tubular conductors 30, 30, insulatedly mounted within the body of said unit, and arranged to register with the conductors 22 of a run unit, it being understood that the location of such conductors 30 within the body of unit 12 corresponds to the location of conductors 22 within the run units. Electrical connection of the conductors 22 with the connector unit conductors 30 may be effected by any suitable means, such as the illustrated conductive pins 32, Figure 1.

Desirably, the bodies of connector units 12 are wholly of electric insulation material.

Connector units 12 are provided, at their end walls, with recesses 34, such recesses being symmetrical with respect to conductors 30, and having a depth desirably slightly more than the extent of projection of conductor unit 20 from the housing of a run unit. The dimensions and configuration of such recesses conform to the external dimension and configuration of the outer envelope of such conductor unit 20, whereby the projecting portion of the conductor unit 20 may be inserted into a recess 34 in male and female joint relationship, to protect the zone of connection of the run unit and the connector unit from damage, short circuiting or the like. As indicated in Fig. 1, an end of the housing of unit 60 abuts against the end wall of unit 12'.

A feature of the present invention is the adaptability of the run unit for foreshortening to meet the requirements of an insulation.

To shorten a run unit, it is necessary only to withdraw the conductor unit 20 therefrom to an amount suitably greater than the amount which is to be cut off of the conductor unit. Thereupon any suitable amount may be severed from the housing of the conductor unit, as by a hack saw or like available tool. After the housing portion of the run unit has been cut to desired length, the conductor unit thereof may be cut so that such conductor means will be three-eighths of an inch longer than the new length of the run unit, whereupon the conductor means may be slid back into its operative position, in which position the conductor unit extends three-sixteenths of an inch from each end of the run unit housing.

Whereas I have described my invention by reference to specific forms thereof, it will be understood that many changes and modifications may be made without departing from the spirit of the invention.

I claim:

1. An electricity conductor unit comprising, in combination, an outer member formed from metal shaped in generally arcuate form and having rearwardly arranged flanges affording a mounting surface for the unit, a closure plate coextensive with said outer member and having a continuous pocket, said closure plate having flanges by which said plate is supported on the flanges of said outer member, and said outer member bearing against the pocket of said closure plate to retain the same in position on said flanges, and electricity conductor means removably contained within said pocket.

2. An electricity conductor unit comprising, in combination, an outer member simulating building molding and having rearwardly positioned flanges, said flanges and the front wall of the outer member defining a substantially three-sided hollow structure, a closure plate engageable with said flanges for closing said structure, a channel-formed plate mounted on said closure plate and defining therewith a pocket disposed internally of said hollow structure, and electricity conductor means removably contained within said pocket and coextensive with said outer member.

3. An electricity conductor unit comprising, in combination, an outer member simulating building molding and having rearwardly positioned flanges, said flanges and the front wall of the outer member defining a substantially three-sided hollow structure, a closure plate for closing said structure removably mounted on said flanges, said closure plate being disposed wholly within the boundaries of said three-sided hollow structure, a channel-formed plate mounted on said closure plate and defining therewith a pocket disposed internally of said hollow structure, and electricity conductor means removably contained within said pocket and extending coextensively with said outer member.

4. An electricity conductor unit comprising, in combination, an outer member simulating building molding and having edge formations forming continuous trackway means, a closure plate for said outer member slidably supported on said trackway means, a channel-like member secured to said closure plate to define a pocket therewith, said outer member resiliently bearing against said channel-like member to hold said closure plate on said trackway means, and electricity conductors insulatedly mounted within said pocket.

5. An electricity conductor unit comprising, in combination, a sheet metal member having a front face simulating structural trim and lateral edges bent to provide a discontinuous rear wall, a plate disposed within the space bounded by said front face and said rear wall and supported upon said lateral edges, channel means secured to said plate and defining therewith a tubular passage, and electricity conductor means disposed within said tubular passage and extending coextensively with the unit.

6. An electricity conductor unit comprising, in combination, an outer member having a front face simulating structural trim and lateral edges bent to occupy a common plane and providing a discontinuous rear wall, said front face and said lateral edges defining a hollow structure, a closure plate positioned within said hollow structure and engaging with the said lateral edges, channel means secured to said closure plate and having walls cooperating with said closure plate to define a substantially tubular passage, and electricity conductor means disposed within said tubular passage in engagement with the walls thereof and extending coextensively with the unit.

JOSEPH F. O'BRIEN.